US 7,707,324 B1

(12) United States Patent
Schmidt et al.

(10) Patent No.: US 7,707,324 B1
(45) Date of Patent: Apr. 27, 2010

(54) DMA CONTROLLER EXECUTING MULTIPLE TRANSACTIONS AT NON-CONTIGUOUS SYSTEM LOCATIONS

(75) Inventors: William R. Schmidt, Boise, ID (US); Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 142 days.

(21) Appl. No.: 11/820,340

(22) Filed: Jun. 19, 2007

Related U.S. Application Data

(60) Provisional application No. 60/816,939, filed on Jun. 28, 2006.

(51) Int. Cl.
*G06F 3/00* (2006.01)
*G06F 13/00* (2006.01)

(52) U.S. Cl. ............................................. 710/8; 710/22

(58) Field of Classification Search ........................ None
See application file for complete search history.

(56) References Cited

U.S. PATENT DOCUMENTS

| 4,849,747 | A | * | 7/1989 | Ogawa et al. ................ 345/467 |
| 2006/0080477 | A1 | * | 4/2006 | Seigneret et al. .............. 710/22 |
| 2006/0294343 | A1 | | 12/2006 | Rejmaniak | |
| 2007/0162643 | A1 | | 7/2007 | Tousek | |

OTHER PUBLICATIONS

Intel, 8237A High Performance Programmable DMA Controller (8237A-5), Sep. 1993, Intel.

\* cited by examiner

*Primary Examiner*—Tariq R. Hafiz
*Assistant Examiner*—Scott Sun

(57) ABSTRACT

A direct memory access controller comprises a plurality of registers defining parameters for multiple direct memory access transactions and transfer control circuitry responsive to data in the plurality of registers. The transfer control circuitry is adapted to automatically execute multiple, consecutive data transactions using the parameters of the plurality of registers. At least two consecutive data transactions are executed with respect to non-contiguous system locations.

16 Claims, 7 Drawing Sheets

DMA CONTROLLER EXECUTING MULTIPLE TRANSACTIONS AT NON-CONTIGUOUS SYSTEM LOCATIONS

CROSS-REFERENCE TO RELATED APPLICATION

This application claims the benefit of U.S. Provisional Application No. 60/816,939, filed Jun. 28, 2006, which is hereby incorporated by reference.

BACKGROUND

In microprocessor based system designs, the microprocessor, one or more I/O devices, and the system memory often share a common system bus. Accordingly, communication between the system components takes place over the common system bus. There are a number of different ways in which such communications may take place. However, in each instance, the microprocessor transfers data between the various components on the system bus under the control of application programs. In some cases, the microprocessor must transfer data to a logic block that executes a processing operation on the transferred data. Such processing may include image processing, audio processing, etc.

The manner in which the microprocessor is allowed to handle data transfers varies with the system design. In many systems, direct memory access (DMA) controllers may be employed to significantly reduce involvement of the microprocessor in the data transfer operations and thereby increase data transfer throughput. In many DMA transfers, the microprocessor programs the DMA controller with information relating to the source and destination addresses as well as the length of the data block that is to be transferred. The microprocessor then relinquishes control of the system bus to the DMA controller, which drives the system bus and generates the control signals to perform the data transfer. The DMA controller directs the reading of the data from the source address during, for example, a first clock cycle, and directs the writing of the data to the destination address during, for example, a second clock cycle. After each word of data is transferred, the source and destination addresses are automatically incremented (or decremented), and the value for the length of the data block is decremented. The data transfer operation then is repeated for the next word. The DMA controller ceases data transfer operations in response to an underflow of the value for the length of the data block. The DMA controller generates an interrupt to the microprocessor once all data transfers of the data transaction have been completed.

Although the DMA data transfer method reduces the need for intervention of the microprocessor in various data transfer operations, it still requires the microprocessor to set up each data transaction. Additionally, the microprocessor must perform an interrupt service routine upon completion of each data transaction. Still further, such DMA operations are not well suited for transferring data from non-contiguous memory locations to a logic block since each transaction must be programmed and serviced by the microprocessor. Alternative DMA operations and architectures are therefore desirable.

SUMMARY

The present invention is defined by the following claims, and nothing in this section should be taken as a limitation on those claims. By way of introduction, the embodiments described below provide a direct memory access controller comprising a plurality of registers defining parameters for multiple direct memory access transactions and transfer control circuitry. The transfer control circuitry is adapted to automatically execute multiple, consecutive data transactions using the parameters of the plurality of registers. At least two consecutive data transactions are executed with respect to non-contiguous system locations.

In one embodiment, the parameters in the plurality of registers and the transfer control circuitry cooperate to transfer data between system memory and a processing engine. The processing engine may be an image processing engine and the plurality of registers may define direct memory access transactions for multiple color planes in system memory of the image that is to be processed. Other embodiments are provided, and each of the embodiments described herein can be used alone or in combination with one another.

The embodiments will now be described with reference to the attached drawings.

DETAILED DESCRIPTION OF THE PRESENTLY PREFERRED EMBODIMENTS

Figure 1:
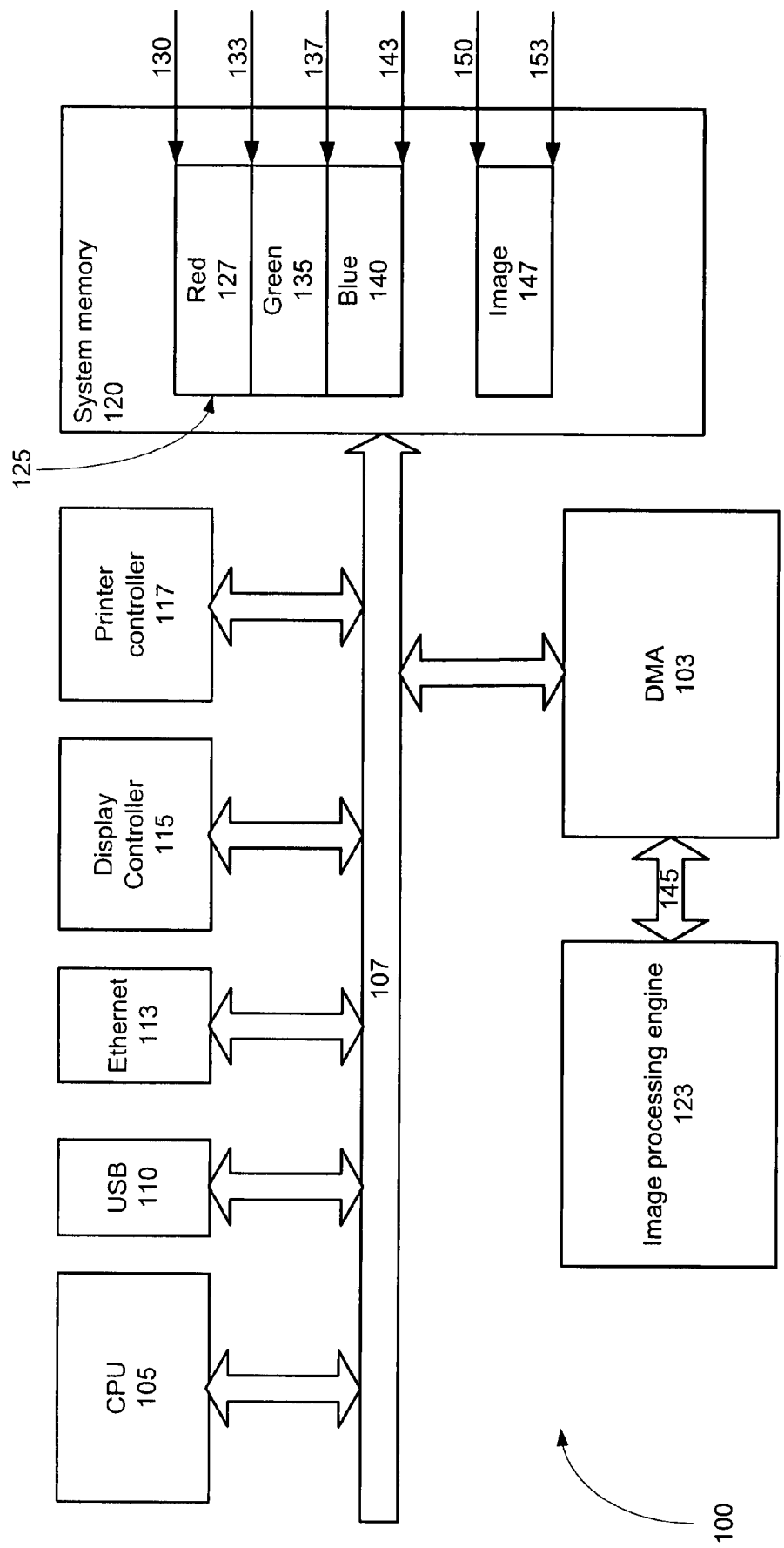
FIG. 1 is a block diagram of a microprocessor-based system employing a DMA controller capable of executing multiple transactions at non-contiguous memory locations.

FIG. 1 is a block diagram of a microprocessor-based system 100 employing a DMA controller 103 capable of executing multiple transactions at non-contiguous memory locations. System 100 employs a plurality of components that are interconnected with a processor 105 over a system bus 107. Depending on the system requirements, the components may include a USB interface 110, an Ethernet interface 113, a display controller 115, a printer controller 117, and system memory 120. System memory 120 may include read only memory as well as random access memory storage. System 100 may also include one or more I/O devices such as a disk drive (floppy, optical, hard disk, etc.), one or more human interface devices, one or more sensors, or the like. For the sake of simplicity, these and other components often used to facilitate operation of the system 100 have not been included in FIG. 1.

The processor 105 executes code that, for example, is stored in system memory 120. This code includes routines that may be executed to program the DMA controller 103 for data transfer operations. In the illustrated system, the DMA controller 103 may be programmed to execute multiple data transactions, each comprising one or more data transfers. Multiple data transactions may be programmed so that the DMA controller 103 automatically executes multiple transactions at non-contiguous sections of system memory 120. A number of different values may be used by the DMA controller 103 in the data transaction and data transfer operations. For example, the DMA controller 103 may be programmed with multiple start address location values used to define start addresses at which DMA transfers for the non-contiguous data transaction are to begin. The DMA controller 103 also employs a further value used to end DMA data transfers for each non-contiguous data transaction. This value may be in the form of a programmable transfer count value, a fixed transfer count value, an end address value, or the like.

Although DMA controller 103 may be configured in a number of different manners, it is shown in system 100 in connection with an image processing engine 123. To this end, image data is provided through, for example, USB interface 110 and/or Ethernet interface 113. Interfaces 110 and/or 113 may be connected to a scanner, external storage device, or the like, that provides unprocessed image data. The unprocessed image data may be provided in any standard or proprietary format. In the illustrated embodiment, the unprocessed image data is provided in a standard RGB format. Accordingly, the unprocessed image data, shown generally at 125, is organized in system memory 120 in a red plane 127 starting at memory storage location 130, a green plane 135 starting at memory storage location 133, and a blue plane 140 starting at memory storage location 137. The color planes 127, 135, and 140 are stored in adjacent sections of memory but, as noted, have non-contiguous starting locations. However, the starting locations for each color plane may be selected so that the end address location for each plane is separated from the starting location of another plane. The arrangement shown in FIG. 1 is merely exemplary and shows all color planes in a block of memory that ends at memory storage location 143.

In operation, DMA controller 103 shuttles small portions of the data from the planes 127, 135, and 140, to the processing engine 123 over process bus 145. For example, DMA controller 103 may shuttle an amount of data corresponding to a single pixel of the unprocessed image from each of the planes to the processing engine 123 where the data from each plane is concurrently processed to generate data for a corresponding processed pixel. A transaction in which an amount of data corresponding to a single pixel may be transferred from the red plane 127 starting from memory storage location 130 may be initiated by the DMA controller 103 pursuant to an image processing operation. The DMA controller 103 may then automatically execute another transaction to transfer an amount of data corresponding to a single pixel from the green plane 135 starting from memory storage location 133. Another transaction then may be executed in which an amount of data corresponding to a single pixel is transferred from the blue plane 140 starting from memory storage location 137. This data may be temporarily buffered by the DMA controller 103 for subsequent transfer to the image processing engine 123 where the RGB data for the pixel may be processed in a generally concurrent manner to generate data for a corresponding processed pixel. Alternatively, the data may be directly transferred between the system memory 120 and the image processing engine 123. The particular order in which the data is transferred and processed may be dependent on system specifications and needs.

Further transactions are executed by the DMA controller 103 for each pixel of the unprocessed image. In these further transactions, additional small portions of data are read from color planes 127, 135, and 140 for ultimate provision to the image processing engine 123. Unlike the initial transactions described above, the further transactions start at memory storage locations that are offset from the starting location of the corresponding color plane. As such, the next transfer of data from the red plane 127 may begin at a memory location within plane 127 that is offset from memory storage location 130. The next transfer of data from the green plane 135 may begin at a memory location within plane 135 that is offset from memory storage location 133. The next transfer of data from the blue plane 140 may begin at a memory location within plane 140 that is offset from memory storage location 137. The initial transactions and subsequent transactions for each color plane in this embodiment are executed from non-contiguous locations in system memory 120. Transactions continue until all pixel data has been transferred from each of the RGB planes 127, 135, and 140.

Processed pixel data is returned over the process bus 145 to the DMA controller 103 for storage in, for example, system memory 120. In the illustrated embodiment, the processed pixel data is stored in a block of image memory 147 starting at memory storage location 150 and ending at memory storage location 153. Once the unprocessed RGB image data has been processed by processing engine 123 and DMA controller 103 has transferred all of the processed image data to image memory 147, DMA controller 103 may interrupt processor 105. In response to the interrupt, the processed image data may be used by display controller 115, printer controller 117, or the like.

Figure 2:
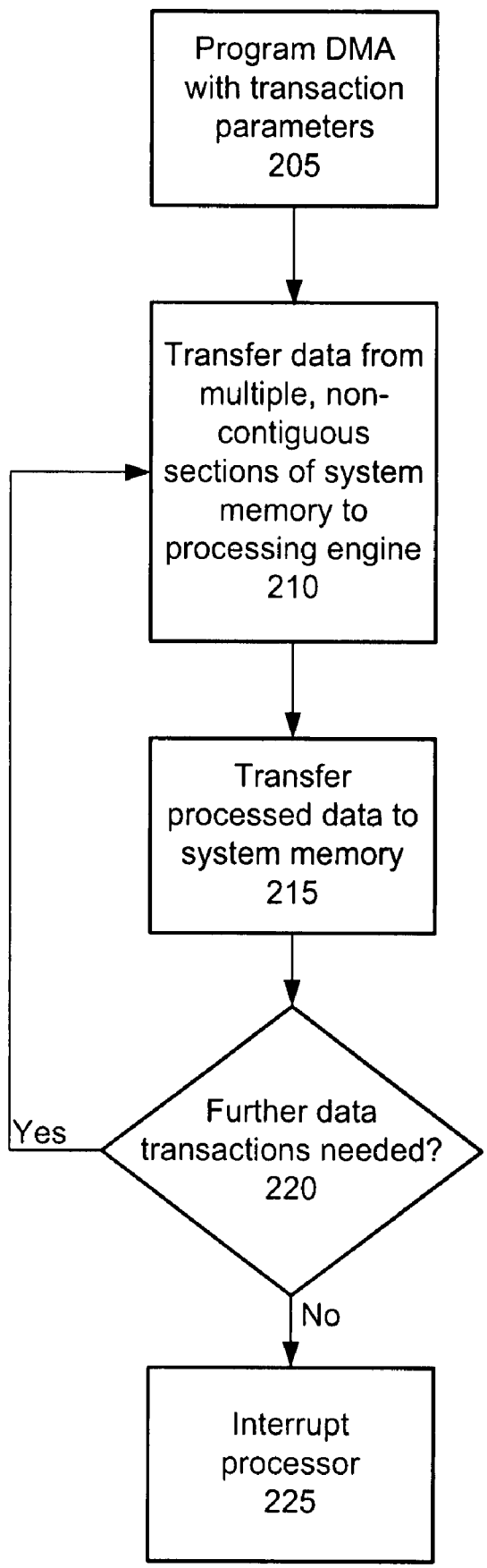
FIG. 2 is a flowchart showing a plurality of interrelated operations that may be executed by the system of FIG. 1 pursuant to conducting multiple DMA transactions at non-contiguous system memory locations.

FIG. 2 is a flowchart showing a plurality of interrelated operations that may be executed by the system of FIG. 1 pursuant to conducting multiple DMA transactions at non-contiguous system memory locations. At block 205, the DMA controller 103 is programmed with transaction parameters used to automatically execute multiple, consecutive transactions at non-contiguous memory locations. Data transfers from multiple, non-contiguous sections of system memory 120 to a processing engine are executed at block 210. Data processed by the processing engine is transferred to system memory 120 at block 215. At block 220, a check is made to determine whether further data transactions are needed. If further data transactions are needed, control returns to block 210 where additional data transactions are executed. If no further data transactions are needed, the processor 105 may be notified of this fact by directing the DMA controller 103 to provide an interrupt signal to the processor 105 at block 225.

Figure 3:
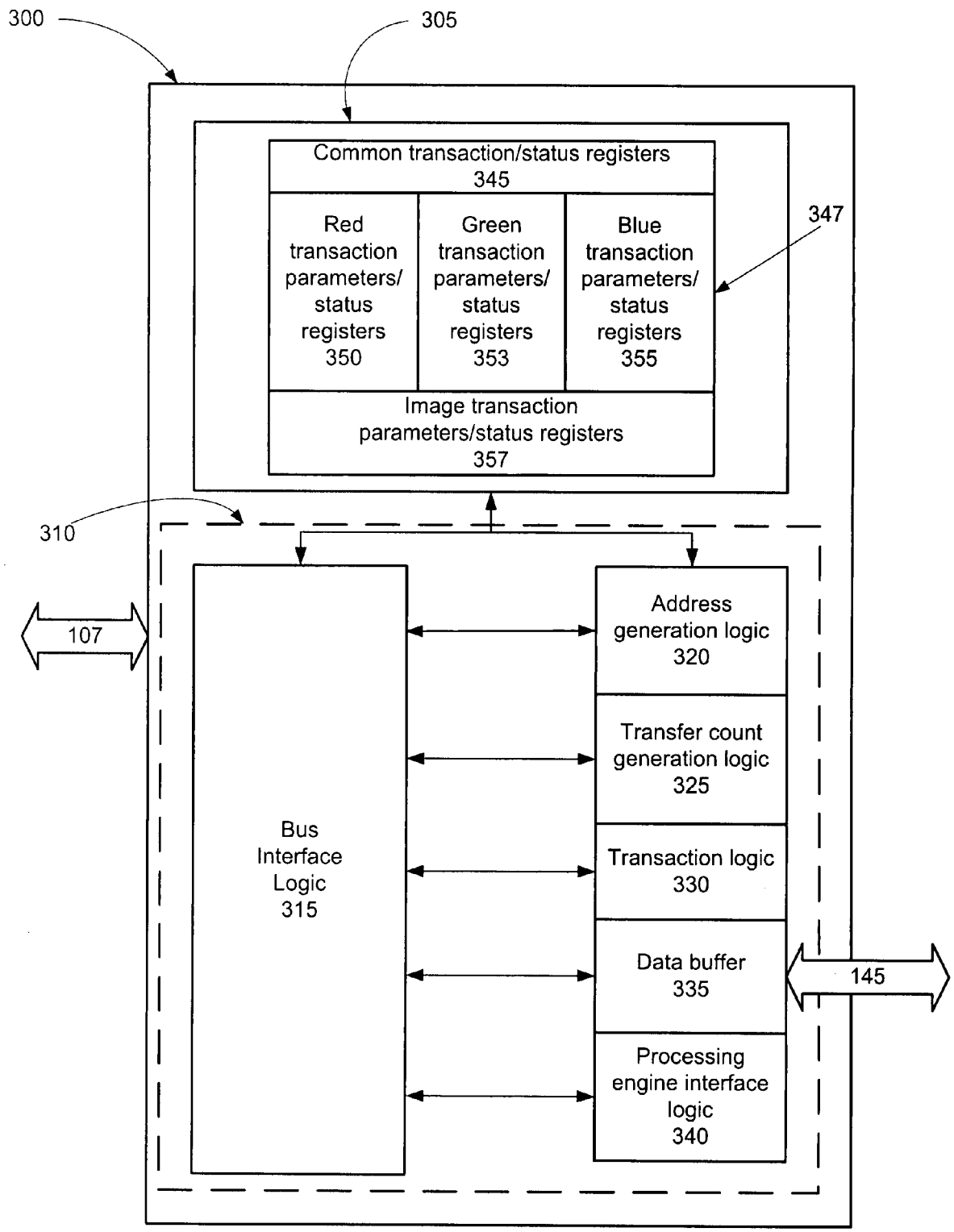
FIG. 3 is a schematic block diagram illustrating one manner of implementing the DMA controller shown in FIG. 1.

FIG. 3 is a schematic block diagram of an embodiment of a DMA controller 300 that may be used in system 100. As shown, the DMA controller 300 may include memory storage 305 and transaction control circuitry 310. The DMA controller 300 is accessible over system bus 107 through bus interface logic circuitry 315. The bus interface logic circuitry 315, in turn, is connected for internal access of the memory storage 305, address generation logic circuitry 320, transfer count generation logic circuitry 325, transaction logic circuitry 330, one or more data buffers 335, and processing engine interface logic 340. Data stored in the data buffer(s) 335 may be accessed from the DMA controller 300 over a data bus 145.

The memory storage 305 includes memory locations that may store a variety of different values used to operate the DMA controller 300. In the illustrated embodiment, the memory storage 305 includes one or more transaction/status registers 345 that are common to all transactional operations of the DMA controller 300. Additionally, the memory storage 305 includes a plurality of transaction/status registers 347 that include values used to define the data transactions that are executed from non-contiguous system memory locations. Since the data transactions of exemplary system 100 are executed from RGB color planes, the transactions/status registers 347 include a first set of transaction parameters/status registers 350 associated with the red color plane 127, a second set of transaction parameters/status registers 353 associated with the green color plane 135, and a third set of transaction parameters/status registers 355 associated with the blue color plane 140. Additionally, memory storage 305 may include one or more memory locations 357 used to store values that define the transaction parameters/status registers associated with data transfers from the image processing engine 123 to the image memory 147.

Figure 4:
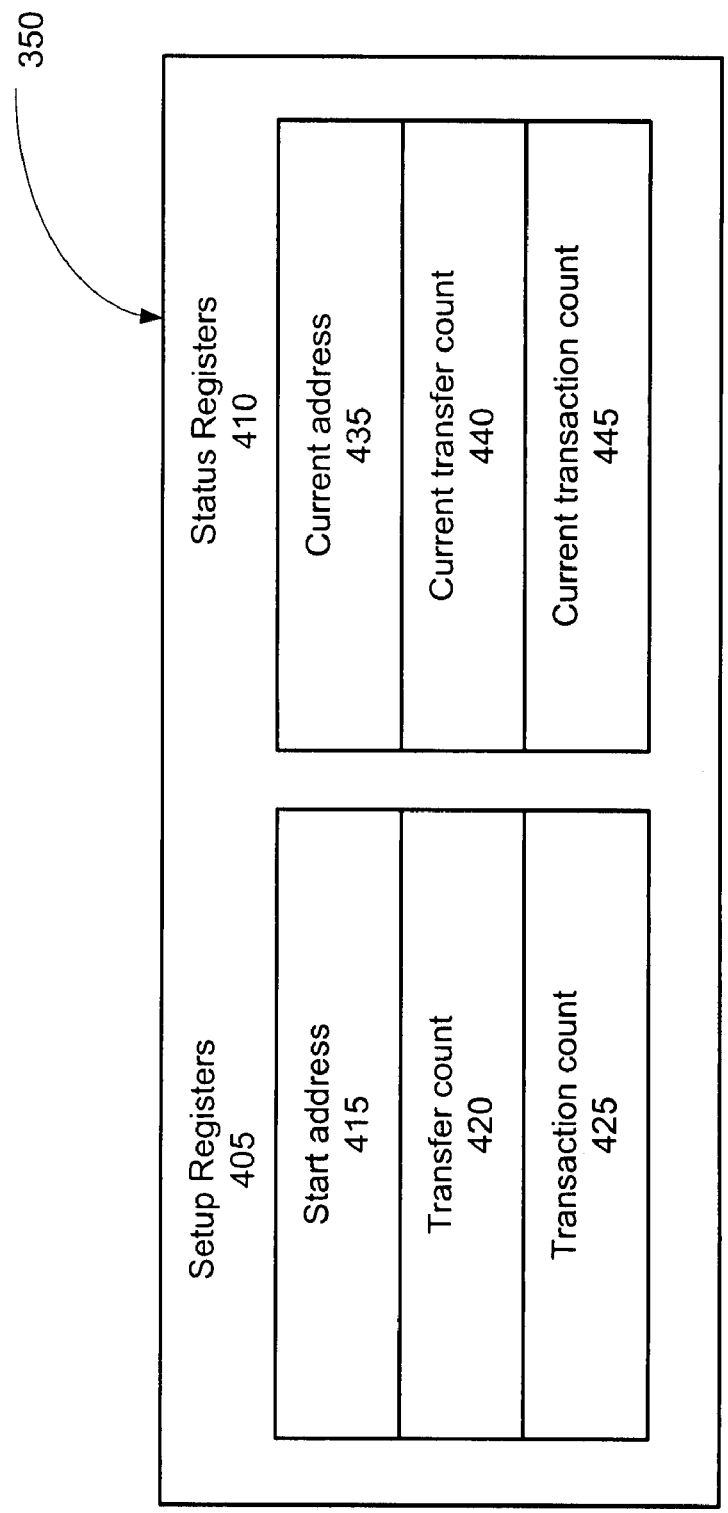
FIG. 4 is a block diagram illustrating one manner of implementing the data transaction parameters/status registers associated with a single data plane shown in FIG. 3.

An exemplary set of registers that may be used in connection with each color plane is shown in FIG. 4. In this example, the red color plane registers 350 are shown. However, each of the remaining color plane registers 353 and 355 may include registers similar to those shown in FIG. 4.

Transaction parameters/status registers 350 may include a plurality of set up registers 405 and a plurality of status registers 410. In the example shown in FIG. 4, the set up registers 405 may include a start address register 415, a transfer count register 420, and a transaction count register 425. These registers may be programmable and are used to set the operating parameters for the red color plane of the DMA controller 300. The status registers 410 of the red color plane include a current address register 435, a current transfer count register 440, and a current transaction count register 445. The status registers 410 may be accessed externally and may include information indicative of the current operational state of the red color plane transactions of the DMA controller 300.

The start address register 415 and transfer count register 420 are used to set the operational parameters associated with the execution of a single data transaction for transfer of a portion of the data from the red color plane to the DMA controller 300 for further transfer to the image processing engine 123. The start address register 415 is programmed with the starting address 130 of the red color plane 127. The transfer count register 420 is programmed with a value corresponding to the total number of data transfers that are to take place from the red color plane 127 to the image processing engine 123 during a single data transaction. The transaction count register 425 is programmed with a value corresponding to the total number of data transactions used to transfer all of the data from the red color plane 127 to the DMA controller 300 for further transfer to the image processing engine 123.

With reference to the status registers 410 of the red transaction parameters/status registers 350, the current address register 435 may be read to return a value corresponding to the source address location that the DMA controller 300 is currently accessing in the red color plane 127 while the current transfer count register 440 may be read to return a value corresponding to the number of bytes left in the current data transaction from the red color plane 127. The current transaction count register 445 may be read to return a value corresponding to the number of data transactions executed or left for execution by the DMA controller 300 to complete all programmed transfers from the red color plane 127.

Figure 5:
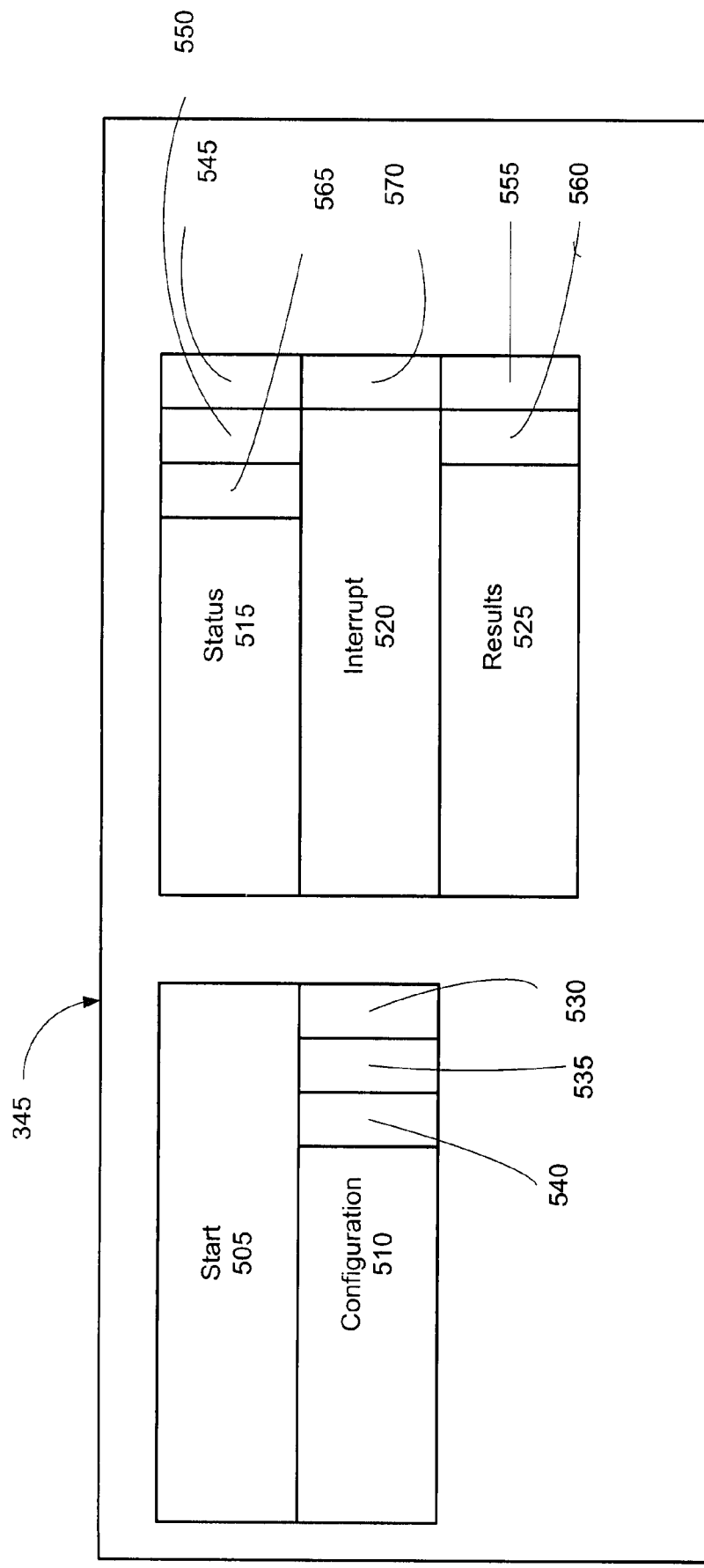
FIG. 5 is a schematic block diagram illustrating one manner of implementing the common transaction parameters/status registers shown in FIG. 3.

FIG. 5 illustrates a number of registers that may be used to implement the common transaction/status registers 345 of the DMA controller 300. In this example, the common transaction/status registers 345 include a start register 505, a configuration register 510, a general status register 515, an interrupt register 520, and a results register 525. The configuration register 510 includes a plurality of programmable bits that determine how the DMA controller 300 will generally operate. To this end, one or more bits 530 may be used to enable and disable the operations of the DMA controller 300. Further, the configuration register 510 may include one or more bits 535 that may be written from an external device to initiate a soft reset. Directing the DMA controller 300 to execute a soft reset operation will cause the DMA controller 300 to shut down and discard unprocessed buffer data. Further, one or more bits 540 of the configuration register 510 may be used to enable and disable the generation of an interrupt by the DMA controller 300 upon completion of all of the programmed data transactions. When the interrupt is enabled, the DMA controller 300 will generate an interrupt to an external device indicating that all programmed data transactions for all color planes as well as the transactions to the image memory 147 have been completed. One or more bits 570 of interrupt register 520 are asserted when an interrupt occurs. The bit(s) may be read to verify the occurrence of an interrupt and may be written to reset the interrupt. When the interrupt is disabled, the DMA controller 300 may operate to continuously execute consecutive, multiple programmed data transactions until directed to do otherwise through, for example, a soft reset or disabling of the DMA engine using the bit(s) 530.

The start register 505 is used to initiate direct memory access operations. Operations will start when a write operation is executed to this register. This register should be written after the transaction parameter registers for each of the color planes 127, 135, and 140 have been programmed with the desired values.

Status register 515 may include one or more bits 545 indicating whether the direct memory access operations are active or inactive. Bit(s) 545 may be checked before writing data to any of the setup registers 405 to ensure that DMA controller 300 is ready for programming. When bit(s) 545 indicates an active state, direct memory access operations are active or have not yet returned to an idle state. When indicative of an inactive state, the DMA controller 300 is quiescent. Status register 515 also may include one or more bits 550 indicating that the DMA controller 300 has generated an interrupt.

The information contained in the results register 525 is valid when bit(s) 550 of the status register 515 is asserted. One or more bits 555 of the results register 525 may be used to indicate the reason for the interrupt. For example, bit(s) 555 may be asserted when the direct memory access operation was terminated by hardware or firmware through, for example, a soft reset or the like. Similarly, one or more bits 555 may be asserted when the direct memory access operation was terminated by an interrupt generated upon completion of all direct memory access transactions for all of the color planes 127, 135, and 140. A plurality of bits 560 of the results register 525 may be used to indicate the total number of bytes for all of the color planes that were actually transferred prior to termination of the direct memory access operation.

One or more bits 565 of the status register 515 may be used to indicate whether or not the DMA controller 300 is ready for programming. For example, bit(s) 565 may be asserted when the DMA controller 300 is ready to accept data in the setup registers for each of the transaction parameters/status registers 350, 353, 355, and 357. If left unasserted, bit(s) 565 indicate that one or more of the transaction parameters/status registers are in use and, therefore, are unable to accept new data transaction parameters.

Figure 6:
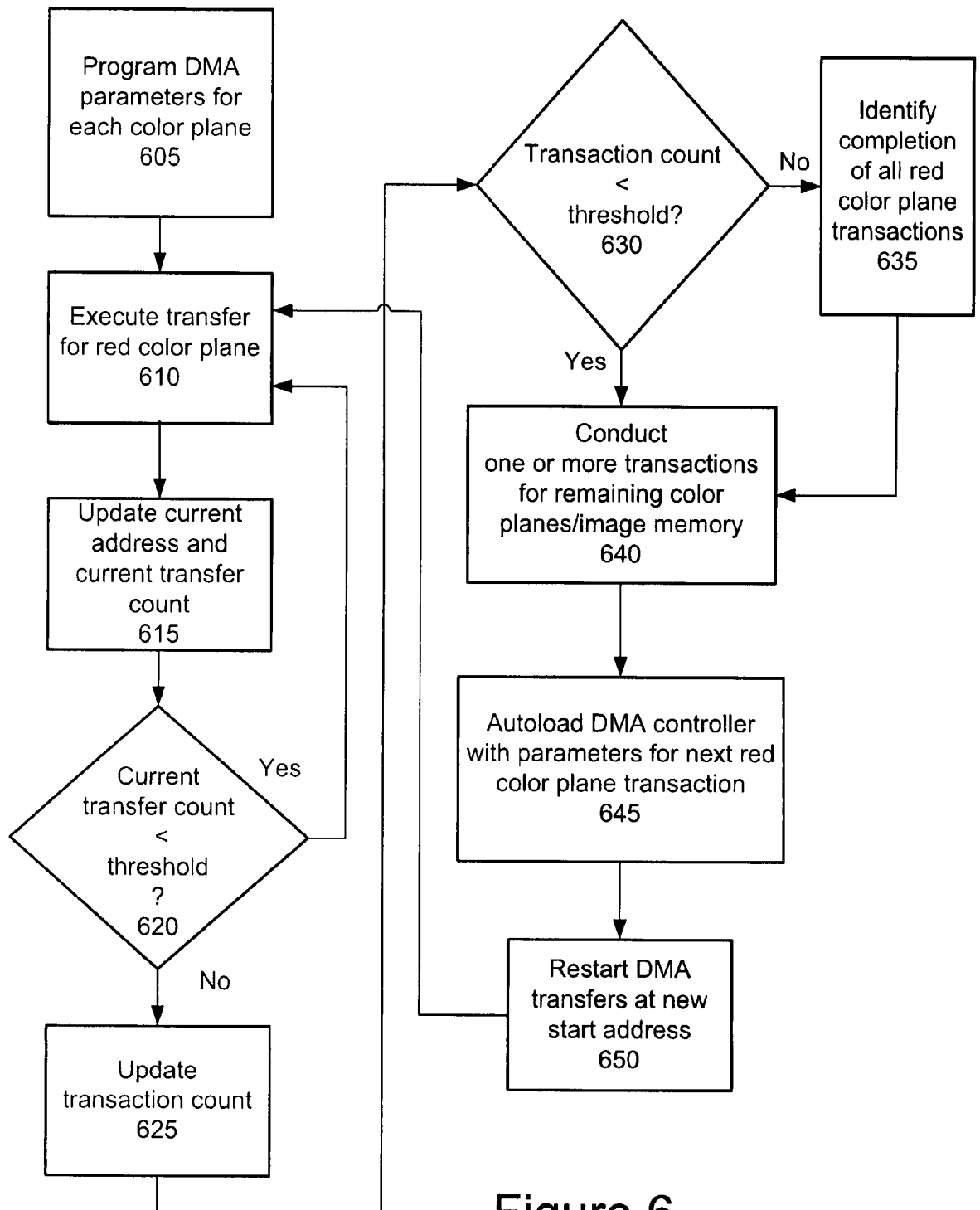
FIG. 6 is a flowchart illustrating a plurality of interrelated operations that may be executed by the DMA controller shown in FIG. 3.

FIG. 6 is a flowchart showing a plurality of interrelated operations that may be used to operate the DMA controller 300. As shown, the DMA controller 300 is programmed with the parameters that define all of the data transactions for each color plane and the image transaction memory at block 605.

Additionally, the common transaction registers 345 may be programmed at block 605. To this end, the processor 105 may access and program the transaction registers over system bus 107 with the assistance of the bus interface logic 315. Execution of the data transfers of the data transaction start for the first data plane may be initiated at block 610. In the illustrated embodiment, the first set of data transfers are associated with the red color plane 127. With each transfer, the current address register 435 may be updated by the address generation logic 320 and the current transfer count register 440 may be updated by the transfer count generation logic 325. These updates may take place in the operation shown at block 615. A check is made at block 620 to determine whether the transfer count is below a threshold value corresponding to the value of the transfer count register 420 programmed at block 605. In the illustrated embodiment, the transaction logic 330 may be used for this purpose. If the transfer count is below this threshold, all transfers for the data transaction have not been completed and control returns to block 610 for execution of another data transfer. If the check at block 620 determines that all transfers for the data transaction have been completed, the current transaction count register 445 may be updated by the transaction logic 330 at block 625.

At block 630, a check is made by, for example, the transaction logic 330 to determine whether all programmed transactions for the red color plane 127 have been executed. This check may involve a comparison between the data stored in the transaction, register 425 and the data stored in the current transaction count 445. If all transactions for the red color plane have been completed, control may be passed to the operation shown at block 635. At block 635, an identifier is provided to indicate that all red color plane transactions have been completed. Under such circumstances, further data transactions from the red color plane may be inhibited. In one example, the identifier may be in the form of one or more bits of the status register 515.

Once the programmed transaction for the red color plane 127 has been completed, the DMA controller 300 conducts one or more transactions for the remaining color planes and image memory at block 640. In the exemplary system, the DMA controller 300 executes at least one data transaction using the values in the green transaction parameters/status registers 353. The transaction for the green color plane 135 may be followed by at least one data transaction using the values in the blue transaction parameters/status registers 355. The transaction for the blue color plane 140 may be followed by at least one data transaction using the values in the image transaction parameters/status registers 357.

Completion of the operations at block 640 may be followed by one or more further transactions associated with the red color plane 127. If further red color plane transactions are needed, the DMA controller 300 may be automatically loaded with the parameters for the next red color plane transaction at block 645. If the red color plane 127 is stored in contiguous portions of system memory 120, then the current address register 435 may be used to determine the index into the red color plane 127 at which the data transfers for the new data transaction are to begin. The value stored in the current transfer count register 440 may be renewed with the values stored in the transfer count register 420. The value stored in the current transaction count register 445 may remain unaltered from its value during the prior data transaction. At block 650, new DMA transfers for the data transaction are initiated and control returns to block 610.

The foregoing DMA operations continue until all pixel data in the red color plane 127, green color plane 135, and blue color plane 140 has been processed by the image processing engine 123 and the processed data returned to the image memory 147. If the interrupt is enabled, the DMA controller 300 may generate an interrupt indicating that all data processing is complete and no further transfers take place without, for example, processor intervention. However, if the data transaction interrupt is not enabled, DMA transfers may be completely restarted using the original data transaction parameters and the DMA controller 300 automatically begins re-executing the data transactions. Automatic repetition of the data transactions may continue until the transactions are stopped by, for example, the occurrence of a soft reset, hard reset, external interrupt, software generated interrupt, disabling of the DMA engine, or the like.

Processing of subsequent image data may proceed using the existing programmed parameters of the DMA controller 300. Alternatively, subsequent image data made be processed using a different set of transaction parameters.

Figure 7:
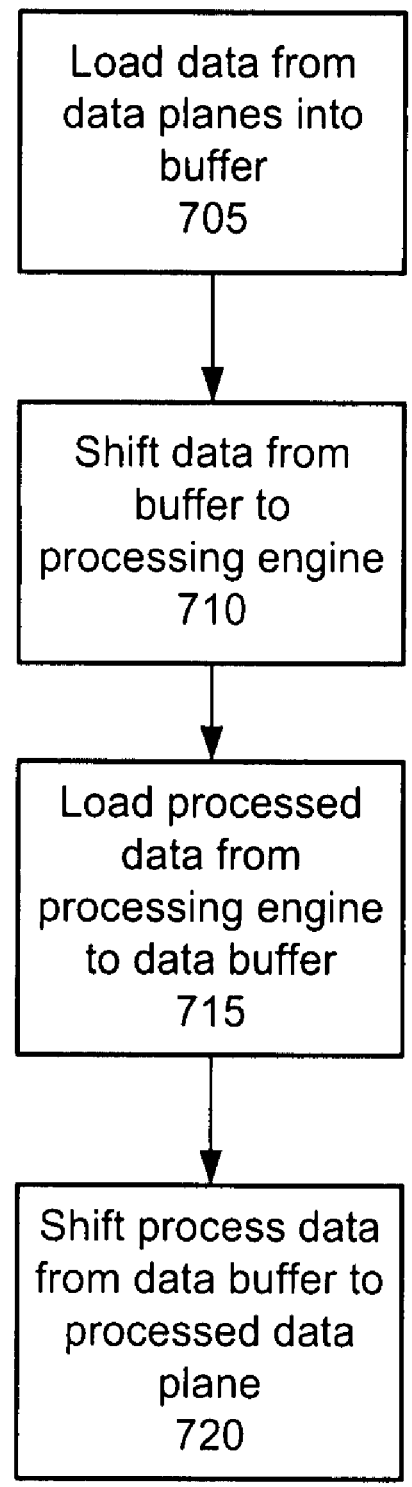
FIG. 7 is a flowchart illustrating a plurality of data related operations that may be executed by the DMA controller of the FIG. 3 in connection with data transfers between system memory and the processing engine.

FIG. 7 is a flow chart showing a plurality of interrelated operations that may be executed by the processing engine interface logic 340 and other components of DMA controller 300 to shift data to and from processing engine 123. In this example, data that is to be concurrently processed by the processing engine 123 is loaded from the data planes, such as color planes 127, 135, and 140, into the data buffer 335 at block 705 using the transaction parameters of the registers 350, 353, and 355. At block 710 this data is shifted from the data buffer 335 to the processing engine 123 over bus 145. This data shifting may take place through, for example, a unilateral or bilateral handshaking process. The processed data is loaded from the processing engine 123 to the data buffer 335 at block 715 over bus 145. Again, this data loading may take place through, for example, a unilateral or bilateral handshaking process. The processed data is shifted from the data buffer 335 to the processed data plane, such as image memory 147, at block 720 using the programmed DMA transaction parameters for the image memory 147.

It is intended that the foregoing detailed description be understood as an illustration of selected forms that the invention can take and not as a definition of the invention. It is only the following claims, including all equivalents, that are intended to define the scope of this invention.

What is claimed is:

1. A direct memory access controller comprising:
a system bus interface adapted for connection to a system memory over a system bus, where the system memory includes first, second, and third color data for each pixel of a plurality of pixels of an image, wherein the0 first, second, and third color data for each pixel of the plurality of pixels is stored respectively at first, second, and third color planes of the system memory, where the first color plane includes first color data for the plurality of pixels of the image, the second color plane includes second color data for the plurality of pixels of the image, and the third color plane includes third color data for the plurality of pixels of the image, and wherein the first, second, and third color data for a given pixel are disposed at non-contiguous memory locations within the system memory;
an image processor interface adapted for connection to an image processing engine over an image processor bus, where the image processor bus is separate from the system bus;
a plurality of registers defining parameters for multiple direct memory access transactions, the plurality of registers including a first set of transaction registers defining parameters for transferring the first color data for each pixel of the plurality of pixels from the first color plane over the system bus for provision to the image processing engine over the image processor bus, a second set of transaction registers defining parameters for transferring the second color data for each pixel of the plurality of pixels from the second color plane over the system bus for provision to the image processing engine over the image processor bus, and a third set of transaction registers defining transfer of the third color data for each pixel of the plurality of pixels from the third color plane over the system bus for provision to the image processing engine over the image process or bus; and transfer control circuitry adapted to automatically execute multiple, consecutive data transactions using the parameters of the plurality of registers, where each data transaction includes transfer of the first, second, and third color data for at least one respective pixel of the plurality of pixels from the first, second, and third color planes to the processing engine for generally concurrent processing of the first, second, and third color data for the respective pixel to generate a corresponding color processed pixel.

2. The direct memory access controller of claim 1, wherein the first color plane is a red color plane, the second color plane is a green color plane, and the third color plane is a blue color plane.

3. The direct memory access controller of claim 1, further comprising at least one data buffer providing temporary storage of color data transferred to the direct memory access controller as a result of at least one data transaction.

4. The direct memory access controller of claim 1, wherein the transfer control circuitry comprises address generation logic adapted to generate source addresses for accessing data in multiple system locations.

5. The direct memory access controller of claim 1, wherein the transfer control circuitry comprises transfer count generation logic adapted to control data transfers occurring during a single data transaction to a predetermined value.

6. The direct memory access controller of claim 1, wherein each of the first, second, and third set of transaction registers comprises a transfer count register indicative of a total number of data transfers that are to be executed by the transfer control circuitry during a single data transaction for the first, second, and third color planes, respectively.

7. The direct memory access controller of claim 1, wherein each of the first, second, and third set of transaction plurality of registers comprises a current address register adapted to store an address value corresponding to a current address to be accessed by the transfer control circuitry during a data transfer for the first, second, and third color planes, respectively.

8. The direct memory access controller of claim 1, wherein each of the first, second, and third set of transaction registers comprises a current count register adapted to store a count value corresponding to a current number of transfers that have been executed by the transfer control circuitry during a data transaction for the first, second, and third color planes, respectively.

9. A direct memory access controller comprising:

system bus interface means for connecting to a system memory over a system bus, where the system memory includes first, second, and third color data for each pixel of a plurality of pixels of an image, wherein the first, second, and third color data for each pixel of the plurality of pixels is stored respectively at first, second, and third color planes of the system memory, where the first color plane includes first color data for each pixel of the plurality of pixels of the image, the second color plane includes second color data for each pixel of the plurality of pixels of the image, and the third plane includes third color data for each pixel of the plurality of images of the image, and wherein the first, second, and third color data for a given pixel are disposed at non-contiguous memory locations within the system memory;

image processor bus interface means for connection to an image processing engine over an image processor bus, where the image processor bus is separate from the system bus;

register means for storing parameters defining multiple direct memory access transactions, the register means including a first set of transaction registers defining parameters for transferring the first color data for each pixel of the plurality of pixels from the first color plane over the system bus for provision to the image processing engine over the image processor bus, a second set of transaction registers defining parameters for transferring second color data for each pixel of the plurality of pixels from the second color plane over the system bus for provision to the image processing engine over the image processor bus, and a third set of transaction registers defining parameters for transferring third color data for each pixel of the plurality of pixels from the third color plane over the system bus for provision to the image processing engine over the image processor bus; and transfer control means for automatically executing multiple, consecutive data transactions using the parameters of the register means, where each data transaction includes transfer of first, second, and third color data for at least one respective pixel of the plurality of pixels from the first, second, and third color planes to the image processing engine for generally concurrent processing of the first, second, and third color data for the at least one respective pixel to generate a corresponding color processed pixel.

10. The direct memory access controller of claim 9 wherein the first color plane is a red color plane, the second color plane is a green color plane, and the third color plane is a blue color plane.

11. The direct memory access controller of claim 9, further comprising data buffer means for temporarily storing data color data transferred to the direct memory access controller as a result of at least one data transaction.

12. The direct memory access controller of claim 9, wherein the transfer control circuitry comprises address generation logic adapted to generate source addresses for accessing data in multiple system locations.

13. The direct memory access controller of claim 9, wherein the transfer control means comprises transfer count generation logic adapted to control data transfers occurring during a single data transaction to a predetermined value.

14. The direct memory access controller of claim 9, wherein each of the first, second, and third set of transaction registers of the register means comprises transfer count storage indicative of a total number of data transfers that are to be executed by the transfer control means during a single data transaction for the first, second, and third color planes, respectively.

15. The direct memory access controller of claim 9, wherein each of the first, second, and third set of transaction registers of the register means comprises a current address register adapted to store an address value corresponding to a current address to be accessed by the transfer control means during a data transfer for the first, second, and third color planes, respectively.

16. The direct memory access controller of claim 9, wherein each of the first, second, and third set of transaction registers of the register means comprises a current count register adapted to store a count value corresponding to a current number of transfers that have been executed by the transfer control means during a data transaction for the first, second, and third color planes, respectively.

* * * * *